Figure 1:
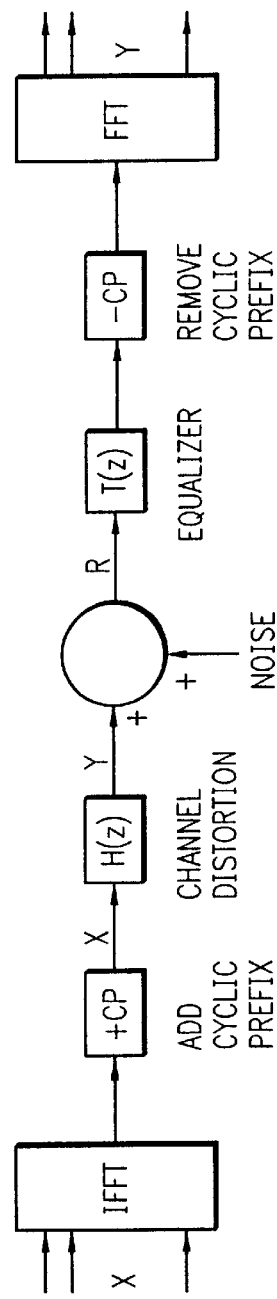

US006097763A

United States Patent [19]
Djokovic et al.

[11] Patent Number: 6,097,763
[45] Date of Patent: Aug. 1, 2000

[54] MMSE EQUALIZERS FOR DMT SYSTEMS WITH CROSS TALK

[75] Inventors: Igor Djokovic, Tustin; Thuji Simon Lin, Irvine, both of Calif.

[73] Assignee: Pairgain Technologies, Inc., Tustin, Calif.

[21] Appl. No.: 08/962,046

[22] Filed: Oct. 31, 1997

[51] Int. Cl.⁷ .............................. H04K 1/10; H04L 27/28
[52] U.S. Cl. .......................................................... 375/260
[58] Field of Search .................................. 375/260, 229, 375/230, 231, 232, 233, 348, 254

[56] References Cited

U.S. PATENT DOCUMENTS

| | | | |
|---|---|---|---|
| 4,141,072 | 2/1979 | Perreault .................................. | 364/553 |
| 4,435,823 | 3/1984 | Davis et al. ............................... | 375/14 |
| 4,475,211 | 10/1984 | Mattis, Jr. et al. ........................ | 375/15 |
| 4,547,889 | 10/1985 | Picchi et al. .............................. | 375/15 |
| 5,155,742 | 10/1992 | Ariyavisitakul et al. ................. | 375/13 |
| 5,222,101 | 6/1993 | Ariyavisitakul et al. ................. | 375/13 |
| 5,249,200 | 9/1993 | Chen et al. ................................ | 375/58 |
| 5,268,930 | 12/1993 | Sendyk et al. ............................. | 375/13 |
| 5,285,474 | 2/1994 | Chow et al. . | |

OTHER PUBLICATIONS

ANSI "Network and customer installation interfaces: Asymmetric digital subscriber line (ADSL) metallic interface," in draft *American National Standard for Telecommunications*, vol. T1E1. 94–007R8, 1995.

Chow, S. Jackey and Cioffi, M. John, "A cost Effective Maxium Likelihood Receiver for Multicarrier Systems", *Intl. Conf on Comm.*, pp. 948–952, Chicage, Jun. 1992.

Tzannes A. Michael, Tzannes C. Marcos, Proakis John and Heller N. Peter, "DMT Systems, DWMT Systems and Digital Filter Banks", *Proceedings of ICC '94*.

Roger A. Horn, and Charles R. Johnson, "Martix Analyssis", Cancridge University Press, 1991.

J.S. Chow et al, "A Discrete Multistone Transceiver System for HdL Applications", Aug. 1991, IEEE Journal on Selected Areas in Communications, vol. 9, No. 6, pp.895–908.

J.M. Cioffi et al, A Data–Driven Multistone Echo Canceller, Globecom, Nov. 1991, pp. 57–61.

J.Pennington, "Techniques for Medium–Speed Data Transmission Over HF Channels," IEE Proceedings, vo. 136, Pt. 1 No. 1, pp. 11–19, Feb. 1989.

Bingham, A.C. John "Multicarrier Modulation for Data Transmission: An Idea Whose Time Has Come", May 1990, IFEEE Journal on Selected Area in Communication, pp. 5–14.

*Primary Examiner*—Stephen Chin
*Assistant Examiner*—Mohammad Ghayour
*Attorney, Agent, or Firm*—Irell & Manella LLP; Norman E. Brunell

[57] ABSTRACT

A improved method for optimally equalizing a multicarrier communications system in the presence of both intersymbol interference (ISI) and colored noise. The method provides a frequency-domain training algorithm to obtain a minimum mean square error (MMSE) equalizer that accounts for both intersymbol interference (ISI) and colored noise, maximizes the signal to noise ratio (SNR) of systems using Discrete Multitone (DMT) modulation, and results in significant performance gains over prior equalization methods.

10 Claims, 5 Drawing Sheets

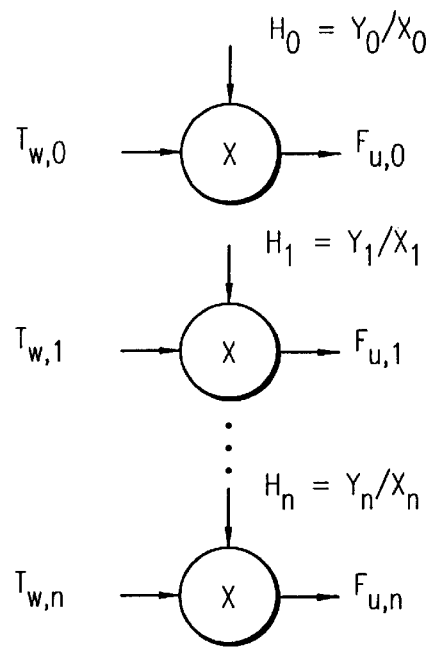
FIG. 5
FIG. 6
*PRIOR ART*
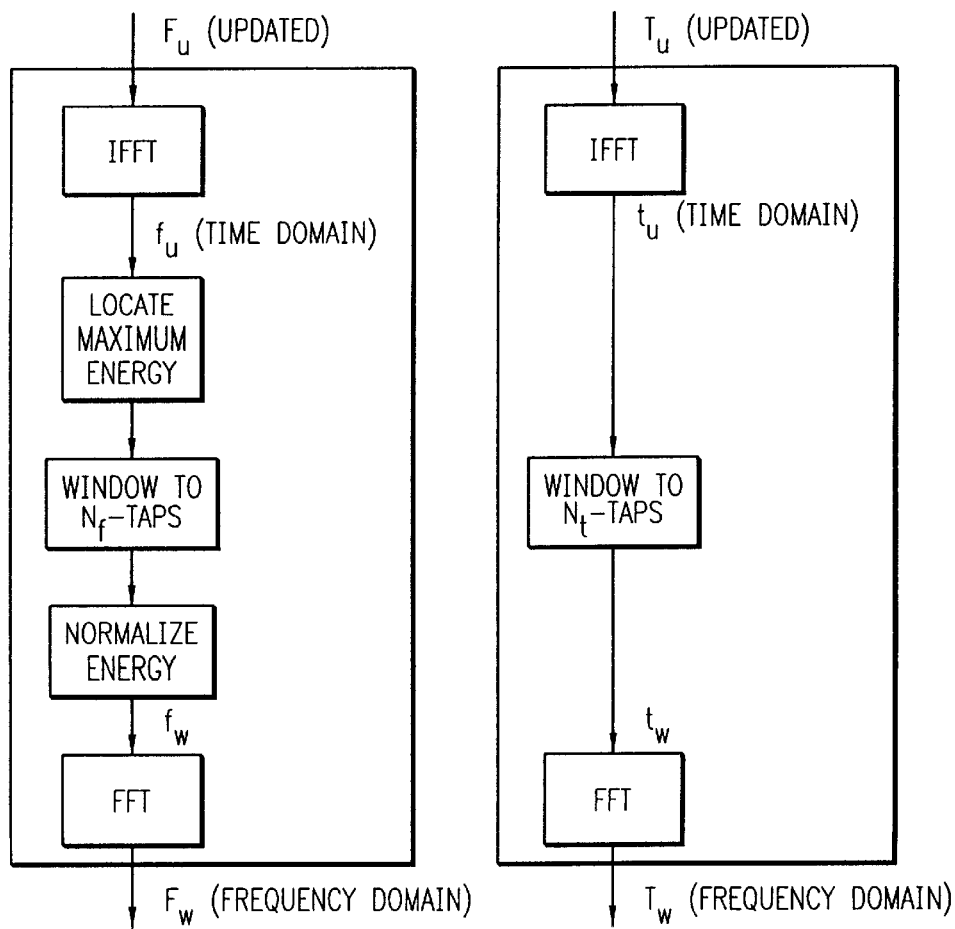

MMSE EQUALIZERS FOR DMT SYSTEMS WITH CROSS TALK

I. FIELD OF THE INVENTION

The present invention pertains to systems for the transmission and reception of multicarrier, high-speed data signals, and more particularly, to an improved method for optimizing the equalization of a multicarrier, high speed data signal in the presence of both intersymbol interference and noise.

II. BACKGROUND OF THE INVENTION

A. Multicarrier Transmission Systems

A simplified model of a multicarrier transmission system is shown in FIG. 1. Multicarrier transmission uses frequency division multiplexing (FDM) to divide the transmission system into a set of frequency-indexed subchannels that appear to be modulated and demodulated independently. If the bandwidth of each subchannel is limited, subchannel distortion can be modeled by a single attenuation and phase-shift. With careful allocation of bits and transmit power to each subchannel, it is well known that such a system is capable of performing at the highest theoretical limits and that no other system can exceed its performance.

Data rates are maximized through multicarrier transmission systems by varying the number of bits per symbol, and the proportion of the total transmitted power that are allotted to each subchannel in accordance with the channel distortion and narrowband noise present in each subchannel. The aggregate bit rate is maximized if these variables are chosen so that the bit error rates in each of the subchannels are equal.

B. DMT Modulation

In DMT modulation, serial input data at a rate of $M^*f_s$ bits per second are grouped into M bits at a block ("symbol") rate of $f_s$ symbols per second. The M bits within each block are further subdivided, $m_n$ bits allotted to the carrier $f_{c,n}$, to modulate the $N_c$ carriers, which are spaced across the usable transmission spectrum. The modulated carriers are summed before transmission, and must be separated in the receiver before demodulation (See FIG. 2.).

In practice, the modulation and demodulation process is implemented with Fast Fourier Transform (FFT) algorithms. Modulation is achieved with the Inverses Fast Fourier Transform (IFFT), which generates $N_{samp}$ samples of a transmit signal for each block of M bits. In the receiver, the received signal is demodulated by each of the $N_c$ carriers, and the $m_n$ bits are recovered from each carrier. Again, the preferred method of demodulation is to sample the received signal, group the samples into blocks, and perform an FFT.

In such a transmission system, the symbol rate, and the carrier frequency separation are typically equal, and the receiver uses $N_{samp}$ samples to retrieve the data.

C. Intersymbol Interference and Noise

This idealized system encounters two types of problems in practice. The first type of problem encountered by multicarrier transmission systems is intersymbol interference (ISI) whereby the symbol decoded at the receiver will include interference from previously transmitted symbols. This type of interference is further aggravated by the high sidelobes in the sub-bands provided by the Fourier transform.

Prior art systems solve the intersymbol interference problems by including a guard band between consecutive symbols. This method, however, reduces the amount of information that can be transmitted.

The second type of problem is caused by colored noise which results from the pickup of other communication signals that impinge on the communication path. These signals enter the system at points in the communication path that are not sufficiently shielded. Providing perfect shielding in long communication paths is not practical.

Figure 3:
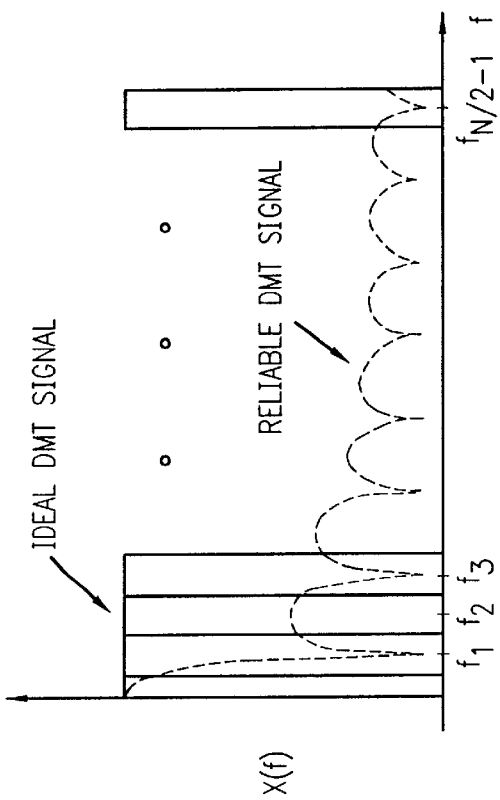

In principle, a multicarrier transmission system can detect the presence of a high noise signal in one sub-band and merely avoid transmitting data in that sub-band. In practice, this solution does not function properly because of the characteristics of the sub-bands obtained using Fourier transforms. The Fourier transform provides sub-bands that are isolated by only 13 dB. Hence, the sub-bands have sidelobes that extend into the neighboring channels (FIG. 3). A large noise signal in one channel will spill over into several channels on each side of the channel in question and thereby degrade the overall performance of the communication system.

D. Equalization of DMT System to Eliminate ISI

Figure 4:
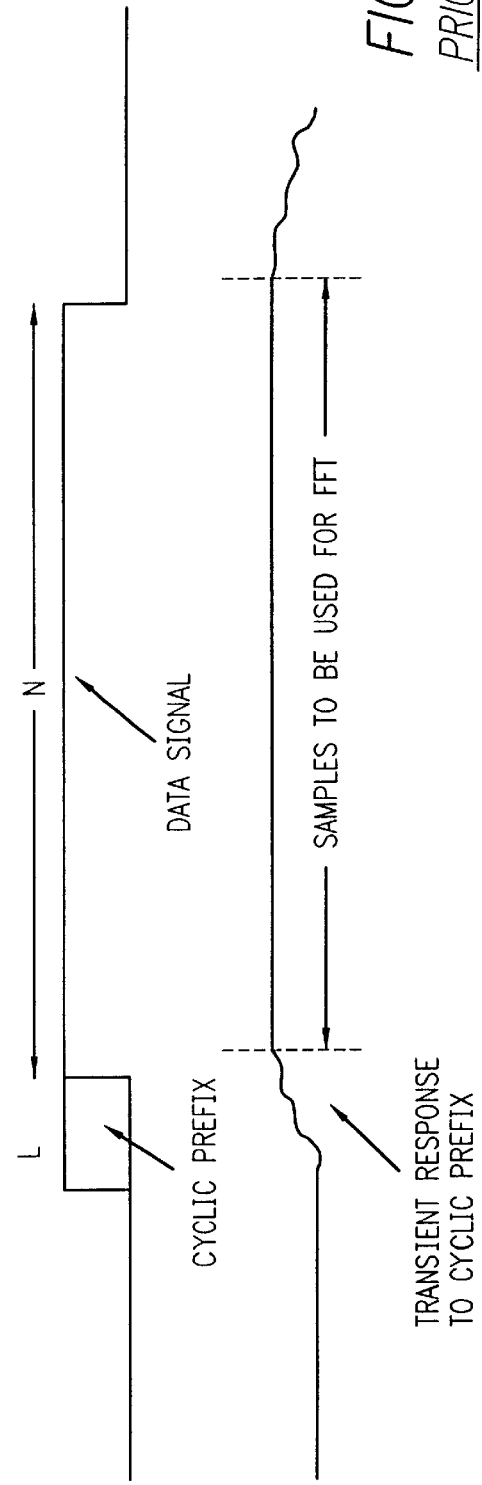

In DMT modulation, a vector of QAM encoded data is the input to the IFFT block, and the output will be a sum of sinusoids with data dependent amplitudes and phases. As mentioned above, ISI causes a part of one symbol to be corrupted by the previous symbol. However, if at the beginning of every symbol, its periodic extension, "cyclic prefix" (CP), of length equal to the length of the channel impulse response were inserted as a guard-band, then the rest of that symbol would be free from ISI (FIG. 4). The longer the symbol duration the smaller the overhead due to CP is. Unfortunately, there are certain limitations on how long a symbol can be. DMT equalizers operate to keep the overhead as small as possible by reducing the effective impulse response of the channel to a duration that is shorter than that of the CP. Shortening the impulse response of a distorting communications channel allows the use of a short, efficient cyclic prefix which is appended to a multicarrier signal.

In the ADSL implementation of DMT, the overhead due to the CP is about 6.25%. The only constraint for the equalizer, therefore, is that the channel frequency response must be shorter than CP. Letting $H(e^{jw})$ be the frequency response of the system between IFFT and FFT blocks, in the absence of noise:

$$H(e^{jw}) = \frac{Y(e^{jw})}{X(e^{jw})}. \quad \text{(Eq. 1.1)}$$

where $X(e^{jw})$ is a wideband periodic signal and $Y(e^{jw})$ is the corresponding received signal. H(z) is modeled as a ratio of two FIR filters F(z) and T(z) of orders $n_f$ and $n_t$ respectively. If T(z) is used as the equalizer, then the overall impulse response is equal to F(z). Now it is easy to see that the only constraint in modeling H(z)=F(z)/T(z) is that F(z) must be shorter than the chosen CP. From Eq. 1.1:

$$F(e^{jw})X(e^{jw})=T(e^{jw})Y(e^{jw}). \quad \text{(Eq. 1.2)}$$

In general it is not possible to find two polynomials F(z) and T(z) such that Eq. 1.2 is satisfied exactly. Therefore, there will always be some residual ISI.

E. Conventional Equalizer Training Algorithm

Eq. 1.2 can be solved using IIR adaptive techniques as described by Chow and Cioffi in U.S. Pat. No. 5,285,474, "Method For Equalizing a Multicarrier Signal in a Multicarrier Communication System." The objective is to satisfy equation Eq. 1.2 in the frequency-domain and use the FFT and IFFT to ensure that T(z) and F(z) have the desired time-domain durations. Let T, F and H be vectors (bold letters denote vectors) of samples of $T(e^{jw})$, $F(e^{jw})$ and $H(e^{jw})=Y(e^{jw})/X(e^{jw})$ respectively (i.e. $T_i=T(e^{2\pi i/N})$ and so on). The iterative technique proceeds as follows:

1. For a given T, compute F=(TH), where brackets ( ) indicate that multiplication is done component-wise.
2. IFFT(F)=f will in general have longer duration than CP, so it has to be windowed. This process involves searching for the window position which captures maximum energy of f and zeroing out components outside the window. As a starting point, assume that the optimal window position is already known.
3. After this windowing, (1.2) is not satisfied anymore. Therefore, the error is provided by:

$$E=(FX)-(TY) \qquad \text{(Eq. 1.3)}$$

and a Least Mean Square (LMS) algorithm is used to update T as follows $T'=T+\mu(EY^*)$. (* denotes complex conjugation)
4. Now IFFT(T)=t is longer than desired and it has to be windowed. Its window can be kept fixed, and the first $n_t$ entries are kept and all others zeroed out.
5. Go to step 1.

These steps are repeated until convergence. There are no published proofs of convergence, and some authors have hypothesized, based on observations, that there may be local minima and that the algorithm may not find the smallest one.

Since vectors X and Y are used to estimate the transfer function, they have to be free of noise. X is the transmit signal and therefore, contains no noise. A noise-free version of the received signal Y is obtained by averaging a certain number of the noisy received signals over time. As a result of this averaging, the noise component of the received signal is lost and the training process does not take it into account. The conventional equalizer, therefore, maximizes signal to ISI ratio (S/I) only. In the presence of a cross-talk (colored noise), this approach does not minimize total error (due to ISI and noise). In an ideal DMT system, where different frequency bins do not overlap in frequency, it does not matter whether channel noise is white or colored because the SNR in a particular bin is affected by the magnitude of the noise Power Spectral Density (PSD) at that frequency only. Unfortunately, practical implementations of DMT using FFT have rather poor frequency selectivity (first side-lobe is at about −13 dB). Consequently, SNR in any bin is a function of the overall noise PSD. One way to deal with this problem is to use a more sophisticated implementation of the DMT system (for example, a maximally decimated filter bank approach as described in ANSI, "Network and customer installation interfaces: Asymmetric digital subscriber line (ADSL) metallic interface," in draft *American National Standard for Telecommunications*, vol. T1E1.4/94-007R8, 1995). Another way is to train the equalizer so as to maximize the signal with respect to the total distortion which consists of both ISI and cross-talk.

It is well known that an equalizer trained by the time-domain LMS algorithm, the most commonly used training algorithm, minimizes the total MSE. (See D. Falconer and F. Magee, *Adaptive channel memory truncation for maximum likelihood sequence estimation*," Bell System Tech. J., vol. 52, No. 9, pp. 1541–1562, November 1973. and While it is possible to use the time-domain LMS algorithm in this case, extensive simulations have shown that it does not perform as well as the frequency-domain training algorithm described below.

The objective of the present invention is to provide a DMT equalizer training algorithm which will provide a unique MMSE equalizer solution that accounts for both ISI and noise.

III. SUMMARY OF THE INVENTION

The present invention provides a modified frequency-domain LMS training algorithm for multicarrier transmission system that accounts for both ISI and noise resulting in a computationally efficient MMSE equalizer.

It is well-known that the time-domain LMS algorithm converges to the MMSE solution in the presence of noise. The present invention modifies the conventional equalizer training algorithm by isolating and providing the noise component within the transmitted data to the iterative LMS training algorithm. The resulting equalizer, therefore, provides an equalizer that is optimized with respect to both ISI and noise, and provides a significantly better signal-to-noise ratio in the presence of colored noise than conventional equalizer training algorithms.

IV. BRIEF DESCRIPTION OF THE DRAWINGS

FIG. 1. Shows a simplified block diagram of a DMT system whereby the channel and equalizer are represented by the transfer functions H(z) and T(z) respectively. External noise is shown as an input to the transmission path and a cyclic prefix is appended to the symbol to provide a guard band against ISI from previous symbols.

Figure 2:
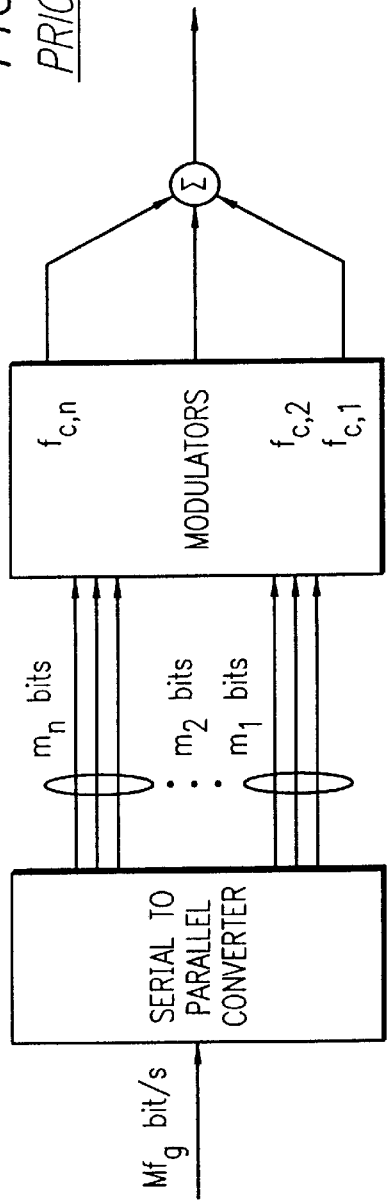

FIG. 2. Shows a simplified illustration of a multicarrier transmitter.

FIG. 3. Shows the ideal and actual frequency content of a DMT signal.

FIG. 4. Illustrates the use of a cyclic prefix in order to accommodate the transient response of a distorted transmission channel in order to avoid corruption of subsequent data.

FIG. 5. Shows a block diagram of the frequency-domain component-wise block multiplication operation of the equalizer T by the channel frequency response H.

FIG. 6. Shows a detailed block diagram of the method for windowing the updated target channel frequency response $F_u$ and the updated channel equalizer $T_u$ respectively.

Figure 7:
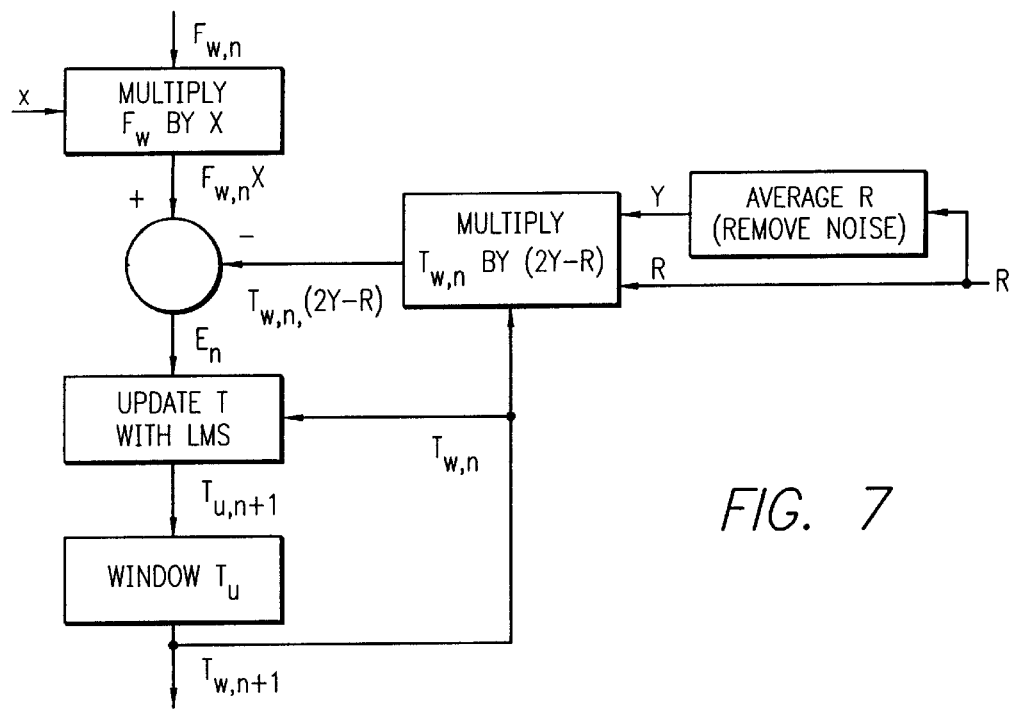

FIG. 7. Shows a detailed block diagram of the frequency-domain LMS method of updating the channel equalizer $T_u$.

Figure 8:
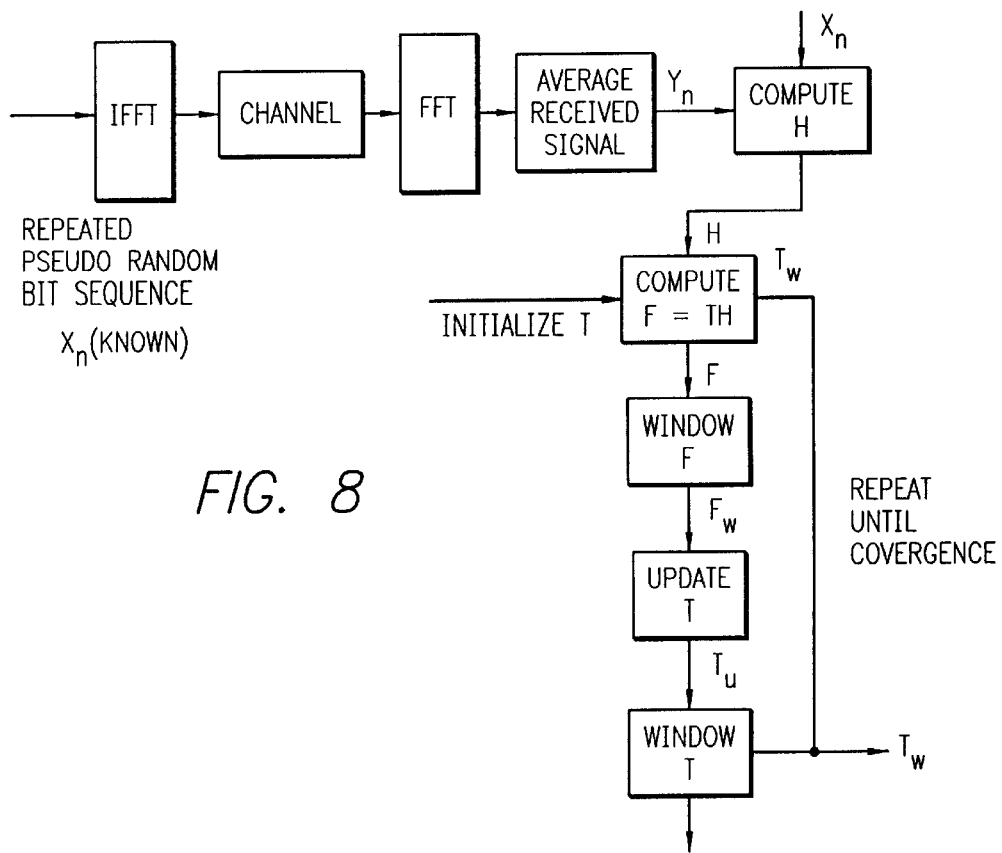

FIG. 8. Shows an overall block diagram of an equalizer training method in accordance with the present invention.

Figure 9:
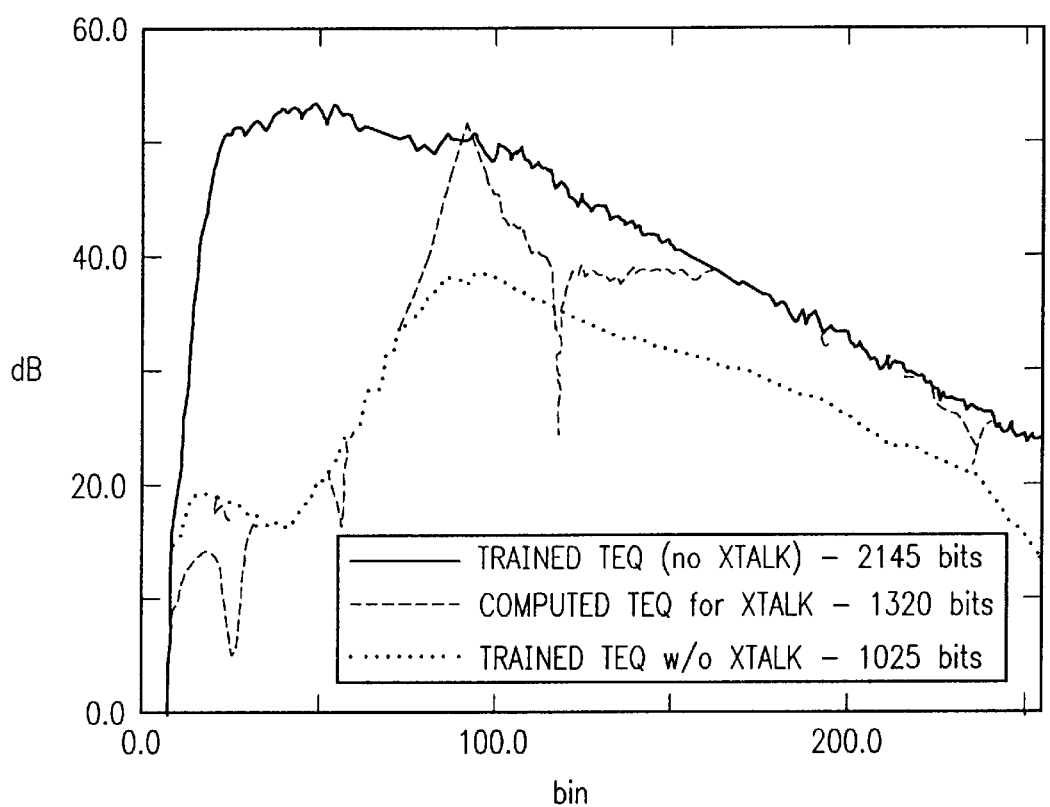

FIG. 9. Illustrates the improved signal-to-noise ratio of a multicarrier transmission system equalized in accordance with the invention.

V. DETAILED DESCRIPTION OF THE INVENTION

A. Modified Equalizer for Both ISI and Noise

This section describes how the standard frequency training algorithm described in Section II.E can be modified to include the effects of colored noise.

DMT modulation allows for very accurate estimation of the channel frequency response at the bin frequencies. During the channel estimation process, a periodic wide-band signal is repeatedly sent by modulating a predetermined symbol X and measuring the received symbol Y. Since this is a periodic signal, there will be no ISI and the channel response at the $k^{th}$ bin's frequency $f_k$ is estimated as $Y_k/X_k$. Any error made in estimating the received symbol Y will result in a worse performance of the trained equalizer. Therefore, it is very important to eliminate effects of noise. This is accomplished by averaging received symbols. Namely, $$Y = \frac{1}{N_{avg}} \sum_{k=1}^{N_{avg}} R_k$$

where $R_k$ is the $k^{th}$ received symbol. Once Y is known, the key equation, $$(FX)=(TY) \quad \text{(Eq. 5.2)}$$

has to be solved for two filters F(z) and T(z) (F and T are their FFTs). After windowing, Eq. 5.2 is not satisfied anymore, and the error is given by:

$$E=(FX)-(TY) \quad \text{(Eq. 5.3)}$$

The conventional training algorithm uses LMS algorithm to update T which is then windowed to achieve a time-domain duration which is shorter than $n_t$. In accordance with the present invention, a noise term is added to the error in this step in order to minimize total MMSE of the equalizer upon convergence of the training algorithm. It is desired to minimize noise after the equalizer, so if N is the noise vector (in the frequency-domain), then after being filtered by the equalizer, its FFT is (TN). This is the noise term that should be added to the LMS error Eq. 5.3. Now the error is given by:

$$E=(FX)-(TY)+(TN). \quad \text{(Eq. 5.4)}$$

In order to implement the improved training algorithm, samples of the noise vector N must be obtained. Throughout the training, the received symbol R consists of the clean symbol Y plus noise, i.e., R=Y+N. Since after the averaging, Y is known, the noise N can be calculated by simply subtracting Y from the received symbol R. The error is now given by:

$$E=(FX)-2(TY)+(TR). \quad \text{(Eq. 5.5)}$$

The steps in implementing new training algorithm are summarized below:

(1) Initialize $T=(1\ 1\ \ldots\ 1)^T$ and $H=(Y_0/X_0\ Y_1/Y_1\ \ldots\ Y_{N-1}/X_{N-1})^T$. Initially, the transfer function of the equalizer is set to unity. A known periodic pseudo-random sequence is transmitted through the transmission channel. The periodic signal contains no ISI and a comparison of the received signal Y with the transmitted signal X yields the channel transfer function H.

(2) In order to satisfy Eq. 5.2, set $F_{u,n}=(T_{w,n}H)$. (Subscripts u and w represent 'update' and 'windowed' respectively). The target system transfer function is computed by multiplying the latest equalizer T by the channel frequency response H which was obtained in step 1. This multiplication process is shown in FIG. 5.

(3) $WIN(F_{u,n}, n_f)$, window $F_{u,n}$ to $n_f$ coefficients. The updated channel frequency response is windowed to a limited number of coefficients as shown in FIG. 6.

(4) Retrieve the most recent noisy received symbol R (present FFT output). The noisy (not averaged) received signal is retrieved for input to the LMS training algorithm. This signal is required in order to accommodate for noise in performing the equalizer optimization.

(5) After the windowing, Eq. 5.2 is not satisfied anymore. Let $$E_n=(F_{w,n}X)-(T_{w,n}(2Y-R)) \quad \text{(Eq. 5.6)}$$

be the error. LMS algorithm is used to update T as follows:

$$T_{u,n+1}=T_{w,n}+\mu(E_nY^*).$$

Using the least mean square optimization routine, update the equalizer T as a function of the transmitted signal X, the channel frequency response F, the averaged received signal Y, and the noisy signal R according to the block diagram shown in FIG. 7.

(6) Updated $T_{u,n+1}$ will in general have time-domain duration longer than $n_t$, and it is necessary to do windowing $WIN(T_{u,n+1}, n_t)$. Windowing is performed on the updated $T_{u,n+1}$ in the same manner as described in step 3 and shown in FIG. 6.

(7) If enough iterations are done, exit, otherwise, set n=n+1, and go to step 2. Continue the iterative process of updating and windowing F and T until a predetermined convergence criterion is met and a sufficiently short channel impulse response is provided. The overall training algorithm in accordance with the present invention is illustrated in FIG. 8.

A. Windowing

Going between frequency and time-domains is at the heart of this algorithm because it is desired to satisfy Eq. 5.2 in the frequency-domain with filters F(z) and T(z) of lengths $n_f$ and $n_t$, respectively. Each update in the frequency-domain (steps 2 and 5) disturbs the desired time durations. Therefore, these steps have to be followed by windowing in the time-domain. This is done as follows. Let f be the inverse FFT of F. First, the window position that captures the most energy of f is sought. Once that window is found, elements of f outside the window are zeroed out. FFT of this windowed $f_w$ is returned as $WIN(F_{u,n}, n_f)$. The same windowing algorithm is used for $WIN(T_{u,n}, n_t)$.

B. A Variation of the Algorithm.

Since the equalizer is trained to satisfy Eq. 5.2, it is obvious that the above algorithm can be modified so as to compute T=F/H in step 2 and update F using the LMS algorithm. This and other minor variations of the conventional algorithm are covered by Chow and Cioffi in U.S. Pat. No. 5,285,474.

C. Performance Improvement of the New Equalizer.

The performance of the new equalizer is measured in a CSA test loop with 20 HDSL cross-talkers. The signal-to-noise ratio in FIG. 9 shows that the equalizer trained in accordance with the present invention performs about 25% better than prior equalizers trained in accordance with conventional training methods.

D. Frequency-Domain Tracking Algorithm

In the modified frequency-domain training algorithm described above, the initial channel impulse response is estimated at discrete bin frequencies by sending a known wide-band periodic signal through the channel and recovering the "unequalized" received signal R. If the modified training algorithm is applied to an equalized system, however, the modified training algorithm would generate an equalizer T based upon the equalized channel response RT rather than R. Repeated application of the modified frequency-domain training algorithm during normal operations would result in an ever-increasing length of updated equalizer T.

Noting that Y is applied to the modified training algorithm by itself only at step 5 and appears elsewhere in the product with T, Y* can be written as $Y^*=(YT)^*T/|T|^2$. Stochastic LMS version of step 5 requires the sign of Y only, which is not affected by $|T|^2$. Therefore, Y can be eliminated from the algorithm and step 5 can be rewritten as, $$T_{u,n+1}=T_{w,n}+\beta \times sgn((T_{w,n}Y)^*T_{w,n})E.$$

While it appears that the tracking algorithm is now identical to the modified frequency-domain training algorithm described above that used Y, this is not the case. In the modified frequency-domain training algorithm, the same Y is used throughout the entire process. In the tracking algorithm, a new averaged received signal Y, is used for each update of the tracking algorithm. Colored noise can also be accounted for in this equalizer tracking algorithm by using the same techniques described in the modified frequency-domain training algorithm described in Sections A through C. This frequency-domain tracking algorithm allows continuous updating of the equalizer during normal operations using data that has been filtered through the equalized transmission path.

Additional detail regarding the improved frequency-domain equalizer training algorithm is provided in Appendix A attached hereto and incorporated herein by reference.

Thus, an improved method for optimally equalizing a multicarrier communications system in the presence of both intersymbol interference and colored noise is provided. While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. In a data communication system comprising a multicarrier transmitter which encodes and modulates input data onto a plurality of carriers, generates n samples of a transmit signal, and then appends to the front of the block of N samples a cyclic prefix of L samples before transmitting all (N+L) samples, a channel which severly distorts signals input to it by the transmitter, and a multicarrier receiver which includes an equalizer which partially equalizes the distorted signals it receives from the channel, and means for removing the L samples of the cyclic prefix, and then demodulating and decoding the remaining N samples, a method of calculating a set of M windowed time-domain equalizer parameters $t_w$ of said equalizer, wherein L, M and N are positive integers, said method comprising the steps of:

(a) initializing said windowed time-domain equalizer parameters $t_w$ and a set of time-domain channel target response parameters $f_u$ to some predetermined initial values;

(b) transforming said windowed time-domain equalizer parameters $t_w$ to obtain windowed frequency-domain equalizer parameters $T_w$;

(c) transforming said time-domain channel target response parameters $f_u$ to obtain frequency-domain channel target response parameters $F_u$;

(d) calculating, in said multicarrier transmitter, a set of N frequency-domain samples of a repetitive multicarrier signal X;

(e) encoding and transmitting said repetitive multicarrier signal X from said multicarrier transmitter through said channel and into said multicarrier receiver to produce a frequency-domain received signal R;

(f) averaging said frequency-domain received signal R to obtain averaged frequency-domain received signal Y;

(g) generating, in said multicarrier receiver, a set of N frequency-domain samples of a local replica X' of said repetitive multicarrier signal X;

(h) using said windowed frequency-domain equalizer parameters $T_w$, said averaged frequency-domain received signal Y, and said local replica X' to update said frequency-domain channel target response parameters $F_u$;

(i) transforming said frequency-domain channel target response parameters $F_u$ to produce a set of time-domain channel target response parameters $f_u$;

(j) windowing said time-domain channel target response parameters $f_u$ by selecting L consecutive samples of $f_u$ to produce a set of windowed time-domain channel target response parameters $f_w$;

(k) transforming said windowed time-domain channel target response parameters $f_w$ to produce a set of windowed frequency-domain channel target response parameters $F_w$;

(l) using said windowed frequency-domain channel target response parameters $F_w$, said local replica X', said windowed frequency-domain equalizer parameters $T_w$ and said averaged frequency domain received signal Y to obtain an updated set of frequency-domain equalizer parameters $T_u$;

(m) transforming said frequency-domain equalizer parameters $T_u$ to produce a set of time-domain equalizer parameters $t_u$;

(n) windowing said time-domain equalizer parameters $t_u$ by selecting M consecutive samples of $t_u$ to produce a set of said windowed time-domain equalizer parameters $t_w$; and (o) repeating steps (e) through (n) until a predetermined convergence condition is determined.

2. The method of claim 1, in which the step of updating the frequency domain channel target response parameters $F_u$ further comprises the steps of:

performing pointwise division of said averaged frequency-domain received signal Y by said local replica X' to obtain channel frequency domain response H; and performing pointwise multiplication of said frequency-domain equalizer parameters $T_u$ by said windowed frequency-domain equalizer parameters $T_w$.

3. In a data communication system comprising a multicarrier transmitter which encodes and modulates input data onto a plurality of carriers, generates N samples of a transmit signal, and then appends to the front of the block of N samples a cyclic prefix of L samples before transmitting all (N+L) samples, a channel which severly distorts signals input to it by the transmitter, and a multicarrier receiver which includes an equalizer which partially equalizes the distorted signals it receives from the channel, and means for removing the L samples of the cyclic prefix, and then demodulating and decoding the remaining N samples, a method of calculating a set of M windowed time-domain equalizer parameters $t_w$ of said equalizer, wherein L, M and N are positive integers, said method comprising the steps of:

(a) initializing said windowed time-domain equalizer parameters $t_w$ and a set of time-domain channel target response parameters $f_u$ to some predetermined initial values;

(b) transforming said windowed time-domain equalizer parameters $t_w$ to obtain windowed frequency-domain equalizer parameters $T_w$;

(c) transforming said time-domain channel target response parameters $f_u$ to obtain frequency-domain channel target response parameters $F_u$;

(d) calculating, in said transmitter, a set of N frequency-domain samples of a repetitive multicarrier signal X;

(e) encoding and transmitting said repetitive multicarrier signal X from said transmitter through said channel and into said receiver to produce a frequency-domain received signal R, said step further comprising the steps of:

(e1) performing pointwise division of said averaged frequency-domain received signal Y by said local replica X' to obtain channel frequency domain response H;

(e2) performing pointwise multiplication of said frequency-domain equalizer parameters $T_u$ by said frequency-domain equalizer parameters $T_w$; and (e3) multiplying said frequency response H by said windowed frequency-domain equalizer parameters $T_w$ to produce $T_w H$;

(f) averaging said frequency-domain received signal R to obtain averaged frequency-domain received signal Y;

(g) generating, in said receiver, a set of N frequency-domain samples of a local replica X' of said repetitive multicarrier signal X;

(h) using said windowed frequency-domain equalizer parameters $T_w$, said averaged frequency-domain received signal Y, and said local replica X' to update said frequency-domain channel target response parameters $F_u$;

(i) transforming said frequency-domain channel target response parameters $F_u$ to produce a set of time-domain channel target response parameters $f_u$;

(j) windowing said time-domain channel target response parameters $f_u$ by selecting L consecutive samples of $f_u$ to produce a set of windowed time-domain channel target response parameters $f_w$;

(k) transforming said windowed time-domain channel target response parameters $f_w$ to produce a set of windowed frequency-domain channel target response parameters $F_w$;

(l) using said windowed frequency-domain channel target response parameters $F_w$, said local replica X', said windowed frequency-domain equalizer parameters $T_w$ and said averaged frequency domain received signal Y to obtain an updated set of frequency-domain equalizer parameters $T_u$;

(m) transforming said frequency-domain equalizer parameters $T_u$ to produce a set of time-domain equalizer parameters $t_u$;

(n) windowing said time-domain equalizer parameters $t_u$ by selecting M consecutive samples of $t_u$ to produce a set of said windowed time-domain equalizer parameters $t_w$; and (o) repeating steps (e) through (n) until a predetermined convergence condition is determined.

4. The method of claims 1 or 3 in which the step of updating the frequency-domain equalizer parameters $T_u$ further comprises the steps of:

capturing a snapshot of the received signal $R_k$, where k is the time index of k'h symbol interval;

performing pointwise multiplication of said local replica X' by said windowed frequency domain channel target response parameters $F_w$ to produce the product $(F_w X')$;

subtracting frequency-domain received signal $R_k$ from 2 times said averaged frequency-domain received signal Y to produce the value $2Y-R_k$;

performing point-wise multiplication of $(2Y-R_k)$ of the previous step by said windowed frequency-domain equalizer parameters $T_w$ to produce the product $T_w(2Y-R_k)$;

subtracting $T_w(2Y-R_k)$ of the previous step from $(F_w X')$ to produce a channel target response error E; and using said channel target response error E, a complex conjugate of said averaged frequency domain received signal Y and the windowed frequency-domain equalizer parameters $T_w$ to correlate E and Y and perform a least mean squares update to obtain updated frequency domain equalizer parameters $T_w$.

5. The method of claim 1 or 3 wherein the step of windowing said time-domain channel target response parameters $f_w$ further comprises the steps of:

searching all the samples of $f_w$ to locate a channel target window group of

L consecutive samples wherein said channel target window group has the largest total energy;

copying the samples of said channel target window group to form subgroup $f_w$ and setting all other samples of $f_w$ to zero; and scaling each of the samples of subgroup $f_w$ by a normalizing factor so that the sum of the squares of the scaled samples equals a predetermined constant;

and wherein, the step of windowing said time domain equalizer parameters $t_w$ further comprises of steps of:

searching all the samples of subgroup $t_w$ to locate an equalizer window group of M consecutive samples wherein said equalizer window group has the largest total energy; and copying the samples of said equalizer window group to for $t_w$ and setting all other samples of $t_w$ to zero.

6. A method of calculating a set of equalizer parameters for use in a multicarrier data communication system which accounts for both intersymbol interference and noise comprising the steps of:

a. Initializing an equalizer $T_n$ and a channel target frequency response $F_n$ to predetermined initial values;

b. encoding and transmitting a multicarrier signal X through said multicarrier communication system to produce received signal R;

c. updating said channel target frequency response $F_n$ as a function of said equalizer $T_n$, said multicarrier signal X and said received signal R to obtain updated target frequency response $F_{n+1}$;

d. windowing said updated target frequency response $F_{n+1}$ to produce windowed updated target frequency response $F_{n+1,w}$;

e. updating said equalizer $T_n$ as a function of said windowed updated channel target frequency response $F_{n+1,w}$, said multicarrier signal X and said received signal R, to obtain updated equalizer $T_{n+1}$;

f. windowing said updated equalizer $T_{n+1}$ to provide windowed updated equalizer $T_{n+1,w}$; and g. repeating steps b. through f. until a predetermined convergence condition is met.

7. A method according to claim 6 wherein the step of updating said channel target frequency response $F_n$ as a function of said equalizer $T_n$, said multicarrier signal X and said received signal R to obtain updated target frequency response $F_{n+1}$ comprises further the steps of:

a. computing averaged received signal Y by averaging said received signal R;

b. computing the unequalized channel frequency response H as a function of said multicarrier signal X and said averaged received signal Y according to the relationship H=(Y/X); and c. computing updated channel target frequency response $F_{n+1}$ according to the relationship $F_{n+1}=(T_n H)$.

8. A method according to claim 7 wherein the step of updating said equalizer $T_n$ as a function of said windowed updated channel target frequency response $F_{n+1,w}$, said multicarrier signal X and said received signal R, to obtain updated equalizer $T_{n+1}$ comprises further the steps of:

a. computing averaged received signal Y by averaging said received signal R;

b. computing the noise signal N as a function of said averaged received signal Y and said received signal R according to the relationship N=R−Y;

c. computing an error signal E as a function of said equalizer $T_n$, said windowed updated channel target frequency response $F_{n+1,w}$, said multicarrier signal X, said averaged received signal Y and said noise N according to the relationship E=$(F_{n+1,w}X)-2(T_nY)+(T_nP)$; and d. updating the equalizer $T_n$ as a function of said equalizer $T_n$, said error signal E and said averaged received signal Y according to the least mean square LMS algorithm according to the relationship $T_{n+1}=T_n+\mu(EY^*)$ wherein $\mu$ is the stepsize of said LMS algorithm, and $Y^*$ is the complex conjugate of said averaged received signal Y.

9. A method according to claim 8 wherein the step of updating said equalizer $T_n$ as a function of said windowed updated channel target frequency response $F_{n+1,w}$, said multicarrier signal X and said received signal R, to obtain updated equalizer $T_{n+1}$ comprises further the steps of:

a. computing the noise signal N as a function of said averaged received signal Y and said received signal R according to the relationship N=R−Y;

b. computing an error signal E as a function of said equalizer $T_n$, said updated channel target frequency response $F_{n+1,w}$, said transmitted signal X, said averaged received signal Y and said noise N according to the relationship E=$(F_{n+1,w}X)-2(T_nY)+(T_nP)$; and c. updating the equalizer $T_n$ as a function of said equalizer $T_n$, said error signal E and said averaged received signal Y according to the least mean square LMS algorithm according to the relationship $T_{n+1}=T_n+\mu(EY^*)$ wherein $\mu$ is the stepsize of said LMS algorithm, and $Y^*$ is the complex conjugate of said averaged received signal Y.

10. A method according to claim 6 wherein the steps of windowing said updated channel target frequency response $F_{n+1}$ and windowing said updated equalizer $T_{n+1}$ are performed in the time domain.

* * * * *

UNITED STATES PATENT AND TRADEMARK OFFICE
CERTIFICATE OF CORRECTION

PATENT NO. : 6,097,763
DATED : August 1, 2000
INVENTOR(S) : Igor Djokovic et al.

It is certified that error appears in the above-identified patent and that said Letters Patent is hereby corrected as shown below:

Column 2,
Lines 45 and 46, in the equation ($e^{jw}$), replace "e" [apparently double printed] with -- $e$ -- [single printed].

Column 3,
Lines 1 and 2, delete "(bold letters denote vectors)".

Column 7,
Line 34, after "generates", delete "n" and substitute therefor -- N --.

Column 8,
Line 43, delete "$T_w$" and substitute therefor -- $T_u$ --.

Column 10,
Line 8, delete "$T_w$" and substitute therefor -- $T_u$ --.

Signed and Sealed this

Eighteenth Day of December, 2001

Attest:

Attesting Officer

JAMES E. ROGAN
Director of the United States Patent and Trademark Office